United States Patent
An et al.

(10) Patent No.: US 9,864,520 B2
(45) Date of Patent: Jan. 9, 2018

(54) POLICY-BASED ORCHESTRATION METHOD IN EXASCALE CLASS CLOUD STORAGE ENVIRONMENT AND STORAGE SYSTEM USING THE SAME

(71) Applicant: Korea Electronics Technology Institute, Seongnam-si, Gyeonggi-do (KR)

(72) Inventors: Jae Hoon An, Seongnam-si (KR); Chang Won Park, Hwaseong-si (KR); Young Hwan Kim, Yongin-si (KR)

(73) Assignee: KOREA ELECTRONICS TECHNOLOGY INSTITUTE, Seongnam-si, Gyeonggi-Do (KR)

(*) Notice: Subject to any disclaimer, the term of this patent is extended or adjusted under 35 U.S.C. 154(b) by 25 days.

(21) Appl. No.: 15/008,400

(22) Filed: Jan. 27, 2016

(65) Prior Publication Data

US 2017/0177234 A1 Jun. 22, 2017

(30) Foreign Application Priority Data

Dec. 21, 2015 (KR) .................. 10-2015-0182641

(51) Int. Cl.
G06F 3/06 (2006.01)
G06F 13/18 (2006.01)

(52) U.S. Cl.
CPC ............ *G06F 3/0605* (2013.01); *G06F 3/067* (2013.01); *G06F 3/0631* (2013.01); *G06F 13/18* (2013.01)

(58) Field of Classification Search
None
See application file for complete search history.

(56) References Cited

U.S. PATENT DOCUMENTS

| 2014/0006609 | A1 | 1/2014 | Gay et al. |
| 2014/0195731 | A1* | 7/2014 | Rajasekaran ......... G06F 3/0617 711/112 |
| 2016/0147608 | A1* | 5/2016 | Anglin ................ G06F 11/1435 711/162 |

FOREIGN PATENT DOCUMENTS

KR 10-2012-0010397 A 2/2012

OTHER PUBLICATIONS

Korean Office Action dated Apr. 6, 2017 for the Korean Patent Application No. 10-2015-0182641.

* cited by examiner

*Primary Examiner* — Brian Peugh
(74) *Attorney, Agent, or Firm* — Hauptman Ham, LLP

(57) ABSTRACT

A policy-based orchestration method in an exascale class cloud storage environment, and a storage system using the same are provided. The storage orchestration method includes: allocating a combination of different storages to a user as a storage space; and adjusting the combination according to a user's using pattern. Accordingly, the storage can be operated optimally and autonomically, and thus can be operated efficiently and economically.

7 Claims, 5 Drawing Sheets

POLICY-BASED ORCHESTRATION METHOD IN EXASCALE CLASS CLOUD STORAGE ENVIRONMENT AND STORAGE SYSTEM USING THE SAME

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Dec. 21, 2015, and assigned Serial No. 10-2015-0182641, the entire disclosure of which is hereby incorporated by reference.

TECHNICAL FIELD OF THE INVENTION

The present invention relates generally to storage management technology, and more particularly, to a storage orchestration method in an exascale class cloud storage environment.

BACKGROUND OF THE INVENTION

An exponential increase of data and resultant difficulty in processing data become more serious in an exascale class cloud storage environment. In particular, storage spaces which are not well utilized make it more difficult to manage storages.

Furthermore, this problem may cause waste of storage resources and also incur much cost in operating the storage resources. Since problems of other aspects may arise, there is a need for an improved method.

Methods utilizing archiving technology have emerged, but they are not regarded as effective methods due to unsatisfactory service quality.

SUMMARY OF THE INVENTION

To address the above-discussed deficiencies of the prior art, it is a primary aspect of the present invention to provide an orchestration method for operating an exascale storage optimally and autonomically, and a storage system using the same.

According to one aspect of the present invention, a storage orchestration method includes: allocating a combination of different storages to a user as a storage space; and adjusting the combination according to a user's using pattern.

The allocating may include allocating a first storage space of a first storage and a second storage space of a second storage to the user based on a user's request.

The allocating may include determining a type and a kind of the second storage based on the user's using pattern.

The adjusting may include reducing an entirety or a part of the first storage space and increasing the second storage space based on a storage space usage rate of the user.

The adjusting may include adjusting a type of the second storage for allocating the second storage space based on the storage space usage rate of the user.

The first storage may be an SSD, and the second storage may be an HDD, and the second storage may be classified into a low specification type, a hybrid type, and a high specification type.

The adjusting may include adjusting the first storage space and the second storage type according to a class which is determined based on the storage space usage rate of the user.

According to another aspect of the present invention, a storage system includes: a monitoring unit configured to monitor a user's storage using pattern; and a management unit configured to allocate a combination of different storages to the user as a storage space, and adjust the combination according to a user's using pattern which is monitored by the monitoring unit.

According to exemplary embodiments of the present disclosure as described above, the exascale storage can be operated optimally and autonomically, and thus structured/unstructured data can be efficiently managed and also the storage can be operated efficiently and economically.

In particular, according to exemplary embodiments of the present disclosure, the storage can be managed continuously and efficiently as a policy-based learning type based on a user's demand for performance/capacity/reliability/cost and a real using state.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
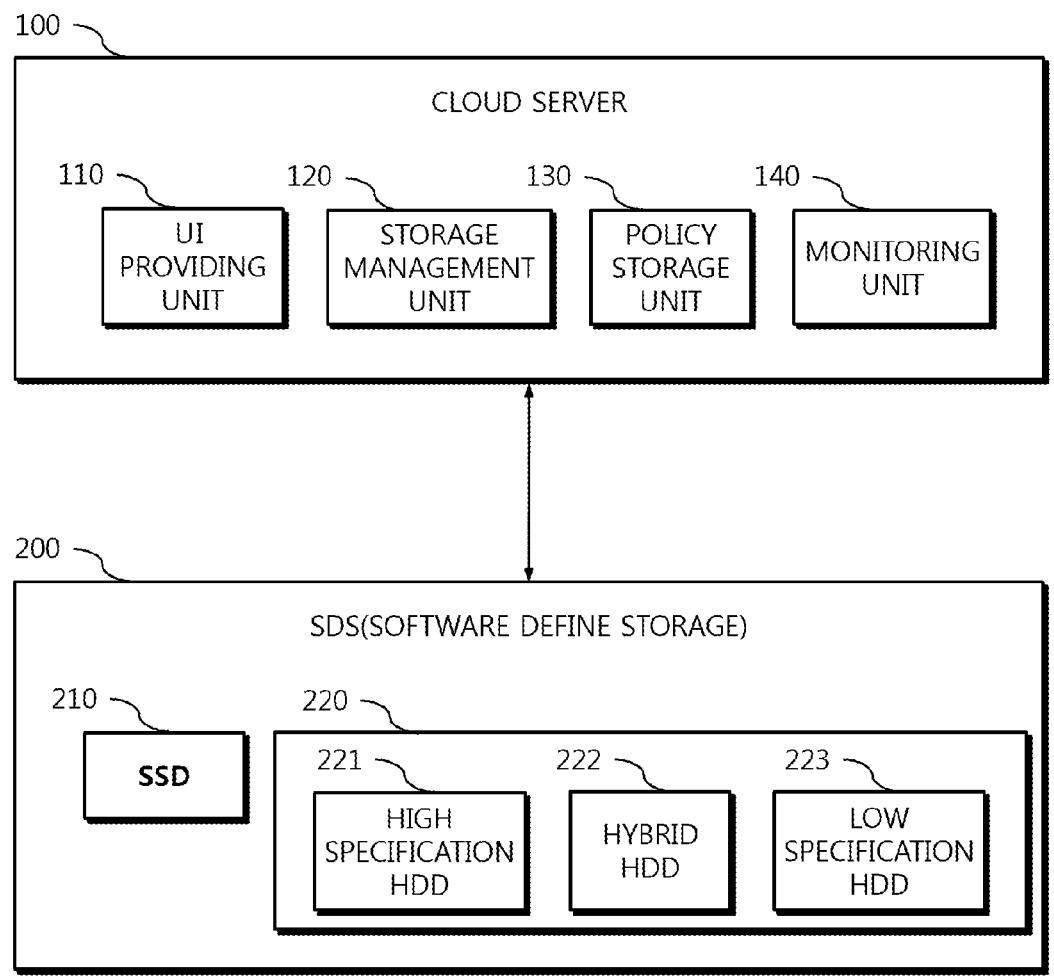
FIG. 1 is a block diagram of a storage system according to an exemplary embodiment of the present disclosure.

Reference will now be made in detail to the embodiment of the present general inventive concept, examples of which are illustrated in the accompanying drawings, wherein like reference numerals refer to the like elements throughout.

The embodiment is described below in order to explain the present general inventive concept by referring to the drawings.

FIG. 1 is a block diagram of a storage system according to an exemplary embodiment of the present disclosure. The storage system according to an exemplary embodiment of the present disclosure is a system for operating/managing an exascale storage.

The scale of the storage implemented in exemplary embodiments of the present disclosure is merely an example and the technical idea of the present disclosure can be applied to operating/managing storages of scales other than the exascale storage.

The storage system according to an exemplary embodiment of the present disclosure is a cloud storage system, and defines storage functions, capacity, performance, etc. provided by storage applications as software and continuously optimizes the operation.

The storage system according to an exemplary embodiment of the present disclosure is established by including a cloud server 100 and a Software Define Storage (SDS) 200.

The cloud server 100 performs software orchestration for operating/managing a storage optimally, harmoniously, and automatically in an exascale cloud storage environment.

The software orchestration performed by the cloud server 100 is based on a policy, is of a learning type, and is continuous.

The cloud server 100 performing such a function includes a User Interface (UI) providing unit 110, a storage management unit 120, a policy storage unit 130, and a monitoring unit 140 as shown in FIG. 1.

The UI providing unit 110 provides a UI necessary for providing a cloud storage service. In particular, according to an exemplary embodiment of the present disclosure, the UI providing unit 110 receives an input of a storage space allocation request from a user. The storage space allocation request includes: 1) kind and capacity of a storage; 2) a frequency of use; 3) a prime time slot of use.

The policy storage unit 130 stores a storage allocation policy. The storage allocation policy includes storage allocation method candidates, types of HDDs to be allocated according to a frequency of use, and kinds of HDDs to be allocated according to a time slot of use.

Figure 3:
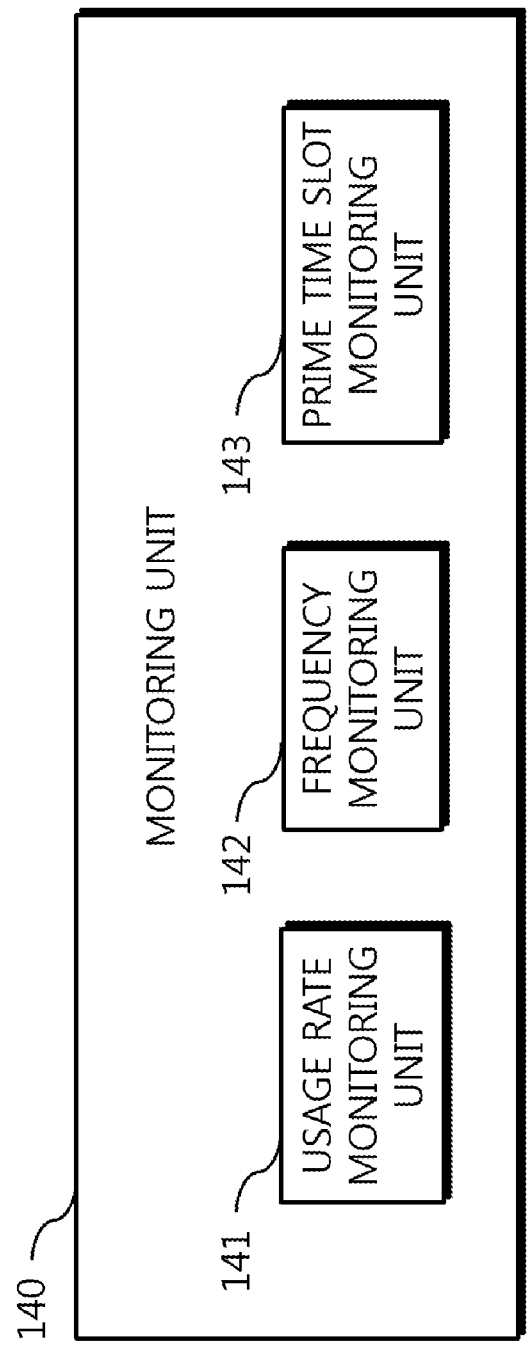
FIG. 3 is a detailed block diagram of a monitoring unit of FIG. 1.

The monitoring unit 140 monitors a user's storage space using pattern, and provides the result of the monitoring to the storage management unit 120. FIG. 3 is a detailed block diagram of the monitoring unit 140.

As shown in FIG. 3, the monitoring unit 140 includes a usage rate monitoring unit 141 for monitoring a usage rate of a storage space, a frequency monitoring unit 142 for monitoring a frequency of use of a storage space, and a prime time slot monitoring unit 143 for monitoring a prime time slot of use of a storage space.

Referring back to FIG. 1, the storage management unit 120 allocates a storage space according to a user's request, thereby providing a cloud storage service, and learns the user's using pattern after allocating and adjusts allocation.

Figure 2:
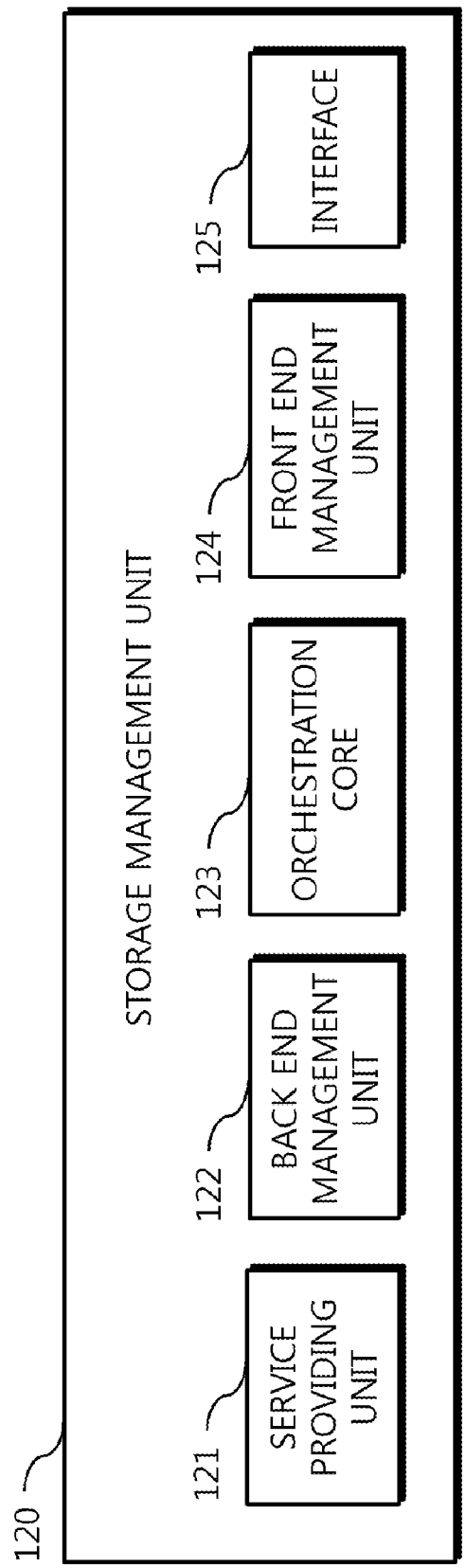
FIG. 2 is a detailed block diagram of a storage management unit of FIG. 1.

FIG. 2 is a detailed block diagram of the storage management unit 120. As shown in FIG. 2, the storage management unit 120 includes a service providing unit 121, a back end management unit 122, an orchestration core 123, a front end management unit 124, and an interface 125.

The service providing unit 121 may access a user's storage, back up a storage, and analyze a storage, which is necessary for the cloud storage service.

The back end management unit 122 generates a volume regarding the SDS 200, checks the state of the SDS 200, and manages the policy.

The orchestration core 123 may optimally allocate the storage space according to a user's request inputted through the UI providing unit 110 based on the allocation policy stored in the policy storage unit 130, and may learn the storage space using pattern which is monitored by the monitoring unit 140 and autonomically maintain storage space optimization.

The front end management unit 124 is responsible for accessing a network, providing an API, and interworking with an application.

The interface 125 provides an interface for an external network as well as an internal interface between the inner elements of the cloud server 100.

Referring back to FIG. 1, the SDS 200 is a set of storages providing an exascale data storage space. The SDS 200 includes a Solid State Disk (SSD) 210 and a Hard Disk Drive (HDD) 220 as shown in FIG. 1.

In addition, the HDD 220 includes a high specification-HDD 221, a hybrid-HDD 222, and a low specification-HDD 223. The high specification-HDD 221 is a high cost/high power HDD which has a high access/response speed, and the low specification-HDD 223 is a low cost/low power HDD which has a low access/response speed.

The hybrid-HDD 222 is an HDD which operates a standby mode, and, in a wake-up state, has a high access/response speed but consumes much power, and, in a standby state, has a low access/response speed but consumes less power.

In FIG. 1, a single SSD 210, a single high specification-HDD 221, a single hybrid-HDD 222, and a single low specification-HDD 223 are illustrated. However, this is merely for convenience of illustration and explanation. In practice, a plurality of SSDs 210, a plurality of high specification-HDDs 221, a plurality of hybrid-HDDs 222, and a plurality of low specification-HDDs 223 may be provided in the single SDS 200.

Furthermore, the storage system according to an exemplary embodiment of the present disclosure may be established by including a plurality of cloud servers 100 and a plurality of SDSs 200.

Figure 4:
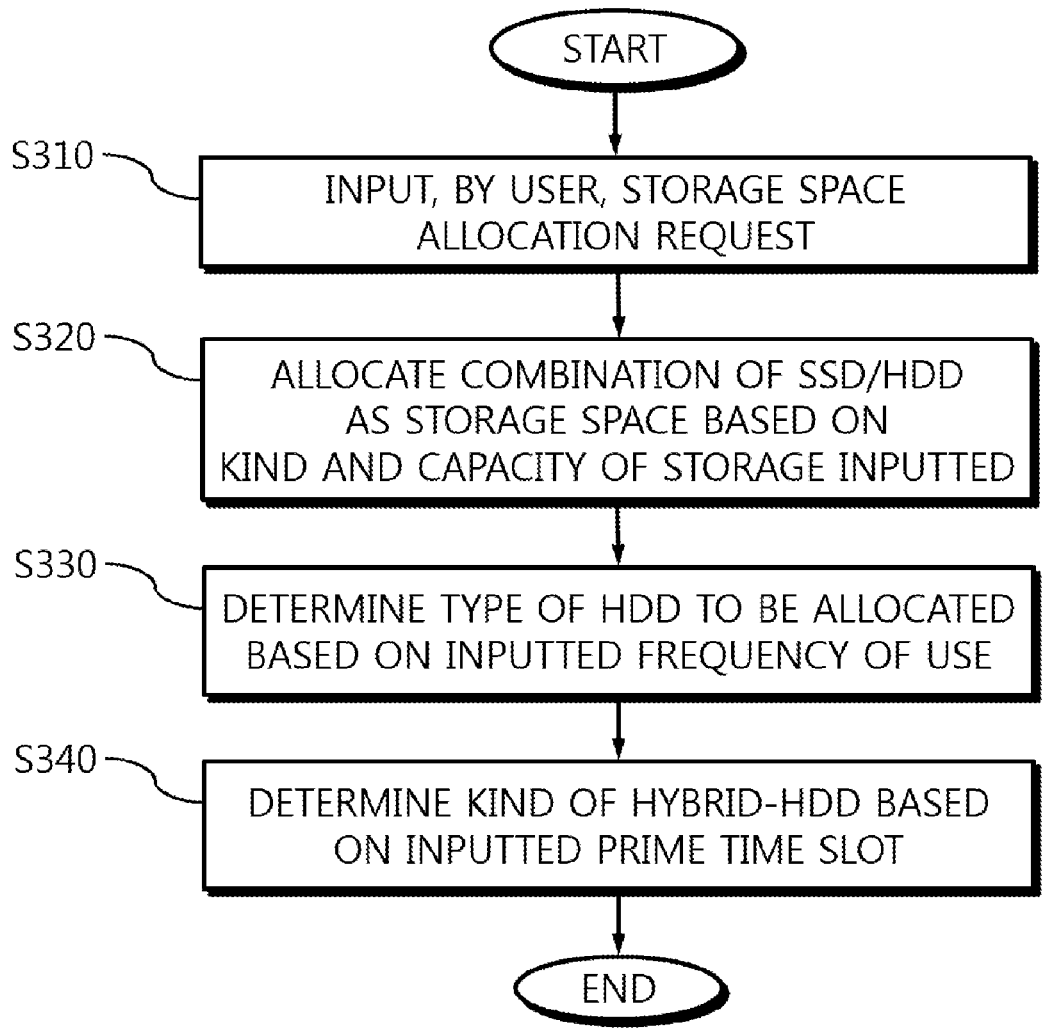
FIG. 4 is a flowchart to explain a process of allocating a user storage space by the storage system of FIG. 1.

FIG. 4 is a flowchart to explain a process of allocating a user storage space by the storage system of FIG. 1.

As shown in FIG. 4, first, the storage management unit 120 of the cloud server 100 receives an input of a storage space allocation request from the user through the UI providing unit 110 (S310).

The storage space allocation request in step S310 includes: 1) kind and capacity of a storage; 2) a frequency of use; 3) a prime time slot of use.

The storage management unit 120 may allocate a combination of the SSD 210 and the HDD 220 to the user as a storage space based on the kind and capacity of the storage inputted in step S310 (S320).

For example, when the user requests an SSD of 10 GB and an HDD of 90 GB, the storage management unit 120 may allocate the SSD of 10 GB and the HDD of 90 GB to the user according to the request in step S320.

The storage management unit 120 may automatically select an allocation method most similar to the user's request with reference to the allocation policy stored in the policy storage unit 130. For example, when there are three allocation methods (an SSD of 10 GB and an HDD of 90 GB, an SSD of 20 GB and an HDD OF 80 GB, an SSD of 30 GB and an HDD of 70 GB), and the user requests an SSD of 17

GB and an HDD of 83 GB, the storage management unit 120 may automatically select the SSD of 20 GB and the HDD of 80 GB.

Furthermore, the user may be allowed to select one of the three allocation methods as user desires.

Next, the storage management unit 120 may determine the type of the HDD 220 to be allocated to the user based on the frequency of use inputted in step S310 with reference to the allocation policy stored in the policy storage 130 (S330).

For example, 1) when the user inputs "frequent" use, the storage management unit 120 allocates the storage space of the high specification-HDD 221, 2) when the user inputs "normal" use, the storage management unit 120 allocates the storage space of the hybrid-HDD 222, and 3) when the user inputs "infrequent" use, the storage management unit 120 allocates the storage space of the low specification-HDD 223.

When the storage space of the hybrid-HDD 222 is allocated, the storage management unit 120 determines a detailed option of the hybrid-HDD 222 based on the prime time slot of use inputted by the user with reference to the allocation policy stored in the policy storage 130 (S340). For example, when the user inputs "morning" as the "prime time slot," the storage management unit 120 determines the hybrid-HDD 222 which is activated in the morning and is in a standby mode in the afternoon and in the night time.

Figure 5:
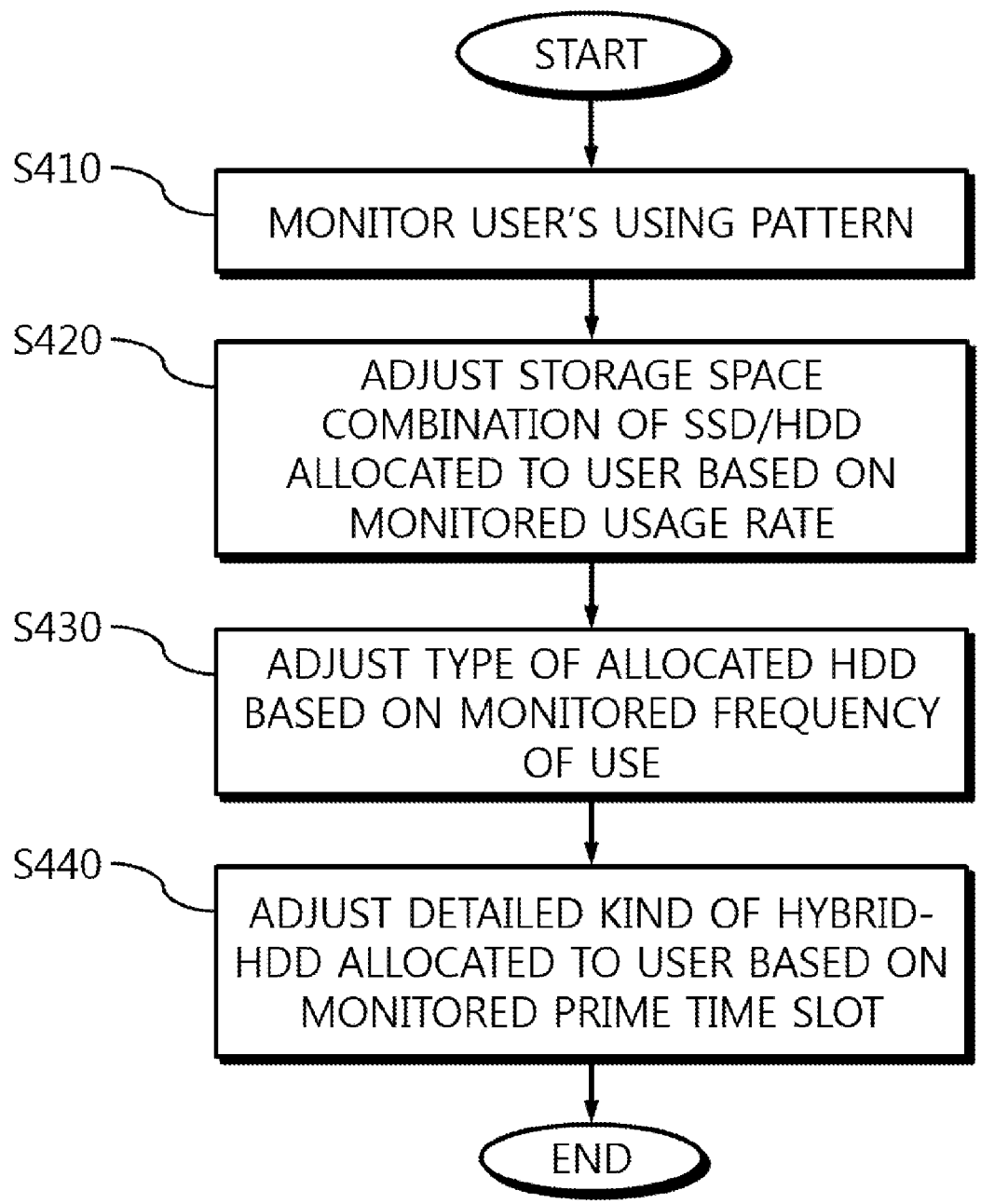
FIG. 5 is a flowchart to explain a storage orchestration process by the storage system of FIG. 1.

FIG. 5 is a flowchart to explain a storage orchestration process by the storage system of FIG. 1.

In FIG. 5, after the storage space is allocated, the monitoring unit 140 of the cloud server 100 monitors a user's using pattern (S410).

In step S410, the monitored using pattern includes a usage rate of a storage space really used by the user, a frequency of use, and a prime time slot of use.

The storage management unit 120 may adjust the storage space combination of the SSD 210 and the HDD 220 allocated to the user based on the usage rate of the storage space monitored in step S410 with reference to the allocation policy stored in the policy storage unit 130 (S420).

For example, the storage management unit 120 may determine a using class based on the storage space usage rate of the user regarding the SSD 210, reduce or increase the storage space of the allocated SSD 210 according to the determined using class, and accordingly, increase or reduce the allocated storage space of the HDD 220.

The using class may be determined relatively according to the storage space usage rate of all of the users. Accordingly, when the usage rate is low but the usage rate of all of the users is lower than the usage rate, a high using class may be determined.

Next, the storage management unit 120 may adjust the type of the HDD 220 allocated to the user based on the frequency of use of the storage space monitored in step S410 with reference to the allocation policy stored in the policy storage unit 130 (S430).

For example, when the user allocated the storage space of the high specification-HDD 221 uses the storage space "normally" rather than "frequently," the storage management unit 120 may change the storage space allocation on the HDD of the user from the high specification-HDD 221 to the hybrid-HDD 222.

In addition, the storage management unit 120 may adjust the kind of the hybrid-HDD 222 allocated to the user based on the prime time slot of use of the storage space monitored in step S410 with reference to the allocation policy stored in the storage 130 (S440).

For example, when the user allocated the storage space of the hybrid-HDD 222 which is activated in the morning and is in the standby mode in the afternoon and in the night time mainly uses the storage space in the afternoon rather than in the morning, the storage management unit 120 may change the hybrid-HDD 222 which is activated in the morning to the hybrid-HDD 222 which is activated in the afternoon.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A storage orchestration method comprising:
   allocating a combination of different storages to a user as a storage space,
      wherein the combination of different storage comprises a combination of a first storage and a plurality of second storages,
         wherein the plurality of second storages comprises a high access/response speed second storage, a low access/response speed second storage and a hybrid second storage having both high access/response speed and low access/response speed,
      wherein the storage space allocated to the user comprises a first storage space from the first storage, and a second storage space from the plurality of second storages, and
      wherein a storage capacity of the high access/response speed second storage, a storage capacity of the low access/response speed storage, and a storage capacity of the hybrid second storage allocated to the user are determined according to an input of a user request; and
   adjusting the combination according to a user's usage pattern, comprising adjusting the storage capacity of the high access/response speed second storage, the storage capacity of the low access/response speed second storage, or the storage capacity of the hybrid second storage allocated to the user according to a determined frequency of use of the storage space by the user.

2. The storage orchestration method of claim 1, wherein the allocation of the first storage space from the first storage, and the at least one second storage space from the plurality of second storages to the user is based on the input of the user request.

3. The storage orchestration method of claim 1, wherein adjusting the combination according to the user's usage pattern further comprises adjusting a storage capacity of the first storage space and a storage capacity of the second storage space according to the determined frequency of use of the storage space by the user.

4. The storage orchestration method of claim 1, wherein adjusting the combination according to the user's using pattern further comprises adjusting the storage capacity of the high access/response speed second storage, the storage capacity of the low access/response speed second storage, or the storage capacity of the hybrid second storage allocated to the user according to a determined storage space usage rate by the user.

5. The storage orchestration method of claim 1, wherein the first storage is an SSD, and each second storage of the plurality of second storages is an HDD, and
   wherein the high access/response speed second storage is a high specification type HDD, the low access/response speed second storage is a low specification type HDD, and the hybrid second storage is a hybrid type HDD.

6. The storage orchestration method of claim 1, wherein adjusting the combination according to the user's using pattern further comprises adjusting a storage capacity of the first storage space and a storage capacity of the second storage space according to a determined storage space usage rate by the user.

7. A storage system comprising:
- a monitoring unit configured to monitor a user's storage using pattern
- a software defined storage comprising a first storage and a plurality of second storages,
  - wherein the plurality of second storages comprises a high access/response speed second storage, a low access/response speed second storage and a hybrid second storage having both high access/response speed and low access/response speed; and
- a management unit configured to:
  - allocate a combination of different storages to the user as a storage space,
  - wherein the storage space allocated to the user comprises a first storage space from the first storage, and a second storage space from the plurality of second storages, and
  - wherein a storage capacity of the high access/response speed second storage, a storage capacity of the low access/response speed storage, and a storage of the hybrid second storage allocated to the user are determined according to an input of a user request; and
  - adjust the combination according to a user's usage pattern which is monitored by the monitoring unit, comprising adjusting the storage capacity of the high access/response speed second storage, the storage capacity of the low access/response speed second storage, or the storage of the hybrid second storage allocated to the user according to a determined frequency of use of the storage space by the user.

\* \* \* \* \*